Sheet 1 — 2 Sheets.
N. Poulson,
Inside Blinds,
N°. 80,215.      Patented July 21, 1868.
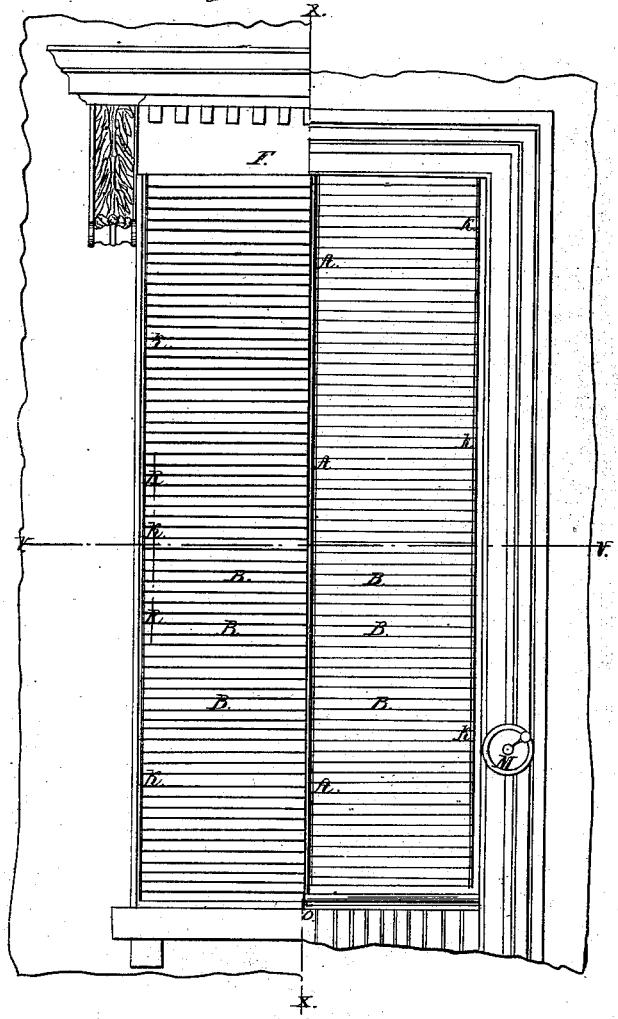
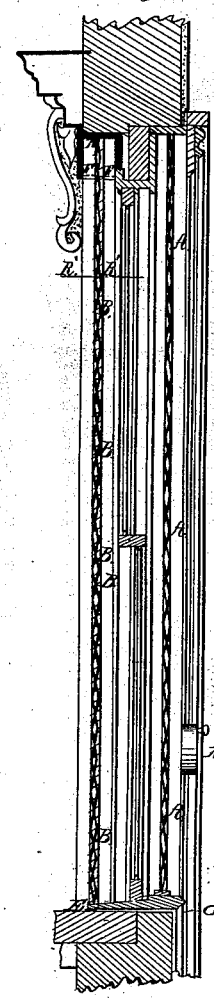
Witnesses:
Octavius Knight
Wm. H. Preston
Inventor:
Nath. Poulson.
N. PETERS, PHOTO-LITHOGRAPHER, WASHINGTON, D. C.

N. Poulson,
Inside Blinds,
No. 80,215. Patented July 21, 1868.
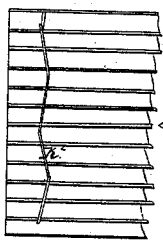
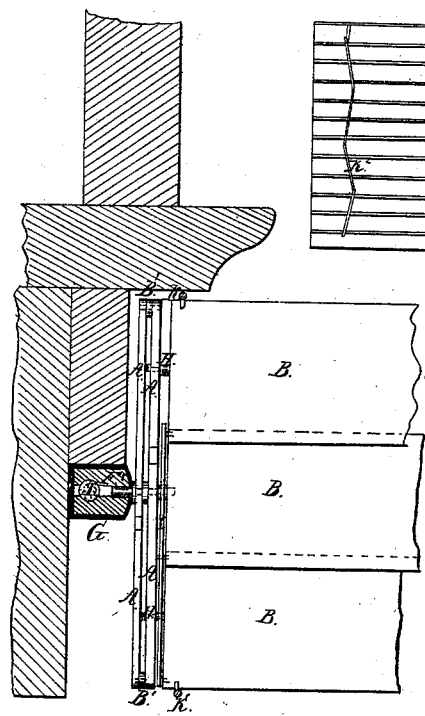
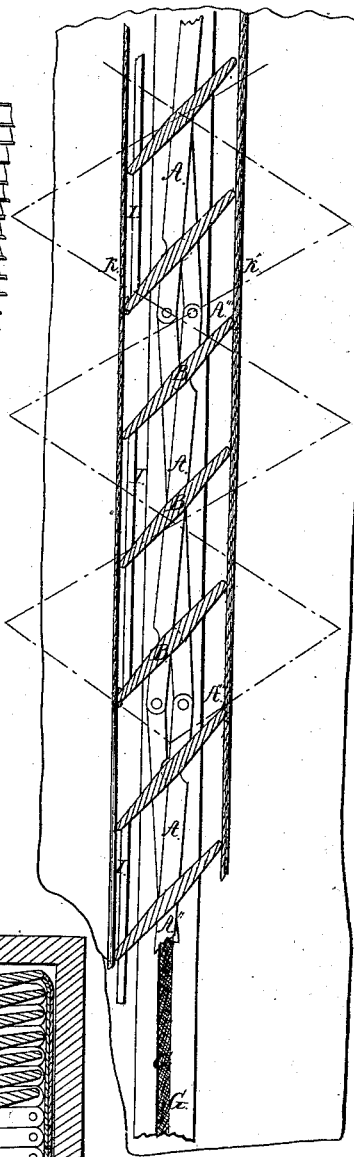
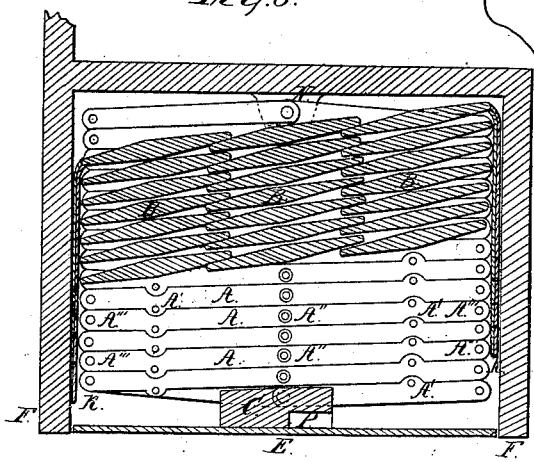
Witnesses:
Inventor.
Niels Poulson.

United States Patent Office.

NIELS POULSON, OF WASHINGTON, DISTRICT OF COLUMBIA.

Letters Patent No. 80,215, dated July 21, 1868.

IMPROVED MOVABLE WINDOW-BLIND.

*The Schedule referred to in these Letters Patent and making part of the same.*

TO ALL WHOM IT MAY CONCERN:

Be it known that I, NIELS POULSON, of the city of Washington, District of Columbia, have invented a new and useful Improvement in Window-Blinds; and I do hereby declare the following to be a full, clear, and exact description of the same, reference being had to the accompanying drawings, making a part of this specification, in which—

Figure 1 is a front elevation.

Figure 2 is vertical section on the line $x\ x$.

Figure 3 is a horizontal section after line $v\ v$.

Figure 4 is a horizontal section on line $y\ y$, on a larger scale, showing a plan of a portion of the blind in its elevated or folded condition.

Figure 5 is a vertical section, showing the slats in an inclined position.

Figure 6 is a vertical section, showing the blind drawn close together.

Figure 7 is a front view, illustrating the use of a jointed rod for tilting the slats.

The same letters of reference, where employed, denote identical parts.

The nature of my invention consists in constructing movable blinds in such a manner that they, when not in use, are drawn up and kept in a hollow space above the window-frame, in which position they are entirely out of sight.

The slats are fastened in such manner on cross-ties that when they are drawn up they form several rows by the side of each other. By this arrangement I save room, or, rather, I can enclose the blind in a space where the width as well as the height is taken into use.

To enable others skilled in the art to make and use my improvement, I will proceed to describe its construction and operation.

In order to raise and lower the blind, I employ the well-known device of pivoting two bars, $A\ A^2$, (of same length,) together at their centres, $A''$, forming a cross-tie, which allows the ends of the two bars to be drawn close together or spread from each other.

I connect as many cross-ties as deemed necessary by pivoting them at their ends $A'''$, one above the other, whereby they all work simultaneously when acted upon. Fig. 5 represents a series of such cross-ties in a position when stretched out at their full length.

It will be seen that when in such position the centres $A''$ are not in the same vertical line as the points, where the ends of the bars are pivoted together, but a space, $A'''$, is left between the ends $A'''\ A'''$ of the bars, and the centres $A''$ lie in a vertical line passing through the middle of said space, in order to avoid what is termed "a dead-point," and no additional force is needed to draw the bars $A\ A^2$ together when in such position. To avoid friction, I provide the joints with washer $B'$, preventing the bars from rubbing against each other.

The bars or links $A\ A^2$ are pivoted together in pairs, and the slats are pivoted to the inner bar $A$ of each pair. $A''$ is the centre, where the bars are pivoted together, and $A'\ A'$ are holes, in which the axles of the slats rest.

The holes $A'$ are placed at such a distance from each other, that when the slats $B$ are inserted they will lap over each other, as shown in fig. 6. The holes $A'$ are not placed in the middle of the bars, but one hole put at the lower and one at the upper edge, so as to bring them all into one vertical line when stretched out, as shown in fig. 5, and in order to strengthen the bar $A$ at such places, a projection is employed. At the centre $A''$ a pin, $F'$, is attached to, the cross-tie, the function of which is to slide in a vertical groove, $G$, or hollow pipe, or other recess in the window-frame, and thereby guide the blind and keep it in a vertical position, as shown in fig. 6.

As the blind is prevented from being drawn to either side, a steady motion will be given to it when drawn up or pulled down.

The drawings show the slats arranged in three rows, that is to say, three slats on each pair of links or bars, but any number may be used with the same advantage, and in ordinary dwelling-houses, where the height of the window is not so extensive, nor the window-jamb so very wide, two rows of slats may be preferable.

Fig. 6 shows the position of the slats when drawn close together, and confined in a hollow space, F, above the window-frame. In such position they take up only about four inches in height, and four inches in width, for a blind that, when lowered down to its full length, will cover a space of fifty-six inches in height.

The slats B are the same shape as those now in general use. They may be manufactured either of wood or metal of a rectangular form, tapering off towards the sides, with rounded edges. At both their ends they are provided with an axle or pin, H, long enough to pass through the hole made to receive them in the bars of the cross-tie, wherein they work freely.

The slats on each bar, (the drawing shows three,) I connect together by a vertical rod, I, fastened at the sides of the slats, and the cord or metallic chain K, which operates the slats, is attached to one of the slats of each bar.

In order to place the slats B in any desired position, (either to darken or admit light into the room,) I attach two cords, K K¹, one fastened to the outside of every one of the upper slats on each bar, and one cord fastened to the inside of every one of the lower slats on each bar.

Instead of cords or chains on both sides of the slats, a jointed rod may be employed on one side only, as shown at K², in fig. 7, which, by its capacity of both drawing and thrusting, will serve to tilt the slats in either direction.

When the slats are drawn up, the cord will also be drawn up, and rest between the edges of the slats and the wall.

The dotted lines in fig. 5 show the cross-ties A in a position when about half drawn up. As the pins F' move in the recess G, in the window-frame, the slat B, placed at the centre of the bar, will consequently move in a vertical line, while the slats at either side of same bars, as the cross-tie is drawn out, will occupy a position to the left and right of the centre slat.

The cord or chain L, used to hoist the blinds, is placed in a hollow vertical space extending into the wall, and I propose to make the hollow pipe or recess G, in which the pins F' slide, deep enough to allow the cord or chain L to move up and down.

The manner of operating the cord may be varied; still, I recommend a winch, M, to be used, as the most convenient means, and it may be made ornamental.

The chain or cord L is fastened to a rail, C, attached to the lower cross-tie. The said rail C may be made of sufficient width to completely close the box or recess F, which receives the folded blind, or a separate plate, E, may be attached to the rail for this purpose.

The upper cross-tie is firmly attached to a hanger, N, and may easily be removed from the inside if desired, but may be made inaccessible from without.

If the window to which the blinds are to be applied is very wide, it is preferable to construct the slats in two lengths, as shown in fig. 3, at a. I may employ my blinds as well outside as inside the window, and provide them with fastenings, thereby preventing the blind being lifted. Fig. 2 shows a device for fastening the blind to the sill of the window. O is a bolt, placed in a horizontal position in the window-sill, and adapted to engage in a recess, P, fig. 6, formed in the rail C, attached to the lower cross-tie. In such position it locks the blind, and can be withdrawn only from the inside. In order to facilitate the movement of the blind, a spring or weight may be employed to balance the blind.

The recess in which the blind is kept may be placed either above the window, as shown in the drawings, or may be at the sides.

Having thus described my improvement, what I claim as my invention, and desire to secure by Letters Patent, is as follows:

1. I claim the pivoted bars or links A A², for elevating or lowering a pivot-slat blind, and permitting the tilting of the slats B, when lowered, substantially as and for the purposes set forth.

2. I claim the arrangement of two or more slats, B, on each of the bars A, to adapt the blind to fold within a smaller vertical space, as explained.

3. I claim the combination of the hinged bars A A², pivoted slats B, connecting-bars I, and tilting-cords, chains, or rods K K¹ K², substantially as described.

4. I claim the combination of the enclosed elevating-cord or chain L, hanger N, guide-pins F', vertical grooves G, and fastening C P O, with the bars A A² and slats B B, for the purpose of raising and lowering the blind, and locking it securely in its extended or closed position.

5. I claim the plate E, in combination with the hinged bars A A², and with the box or recess for enclosing the folded blind out of sight, as described.

NIELS POULSON.

Witnesses:
OCTAVIUS KNIGHT,
WM. H. BRERETON.